(12) United States Patent
Odashiro

(10) Patent No.: US 7,063,041 B2
(45) Date of Patent: Jun. 20, 2006

(54) TEMPERATURE SENSOR LABEL

(75) Inventor: Ken Odashiro, Atsugi (JP)

(73) Assignee: Kabushikigaisha Gee Quest, Shizouka-Pref (JP)

( * ) Notice: Subject to any disclaimer, the term of this patent is extended or adjusted under 35 U.S.C. 154(b) by 0 days.

(21) Appl. No.: 11/014,591

(22) Filed: Dec. 16, 2004

(65) Prior Publication Data

US 2006/0011124 A1   Jan. 19, 2006

(30) Foreign Application Priority Data

Jul. 15, 2004   (JP) ............................... 2004-208311

(51) Int. Cl.
*G01K 11/18* (2006.01)
(52) U.S. Cl. ..................... 116/217; 374/106; 374/162
(58) Field of Classification Search ................ 116/217, 116/219, 216, 207; 374/106, 160, 161, 162
See application file for complete search history.

(56) References Cited

U.S. PATENT DOCUMENTS

| | | | | |
|---|---|---|---|---|
| 3,002,385 A | * | 10/1961 | Wahl et al. .................. | 374/106 |
| 3,059,474 A | * | 10/1962 | Keiler et al. ................. | 374/106 |
| 3,430,491 A | * | 3/1969 | Gignilliat ..................... | 374/106 |
| 3,859,856 A | * | 1/1975 | Keele et al. ................. | 374/160 |
| 3,967,579 A | * | 7/1976 | Seiter .......................... | 116/219 |
| 3,974,317 A | * | 8/1976 | Sharpless .................... | 428/215 |
| 4,057,029 A | * | 11/1977 | Seiter .......................... | 374/106 |
| 4,302,971 A | * | 12/1981 | Luk ............................. | 374/162 |
| 4,428,321 A | * | 1/1984 | Arens .......................... | 116/217 |
| 5,667,303 A | * | 9/1997 | Arens et al. ................. | 374/102 |
| 6,435,128 B1 | * | 8/2002 | Qiu et al. .................... | 116/207 |
| 6,514,462 B1 | * | 2/2003 | Simons .................... | 422/82.12 |
| 6,564,742 B1 | * | 5/2003 | Perner et al. ................ | 116/216 |

* cited by examiner

*Primary Examiner*—R. Alexander Smith
(74) *Attorney, Agent, or Firm*—Flynn, Thiel, Boutell & Tanis, P.C.

(57) ABSTRACT

A temperature sensitive piece 9 has a waxed layer 7 formed on a colored face 4 of a colored paper 6 having an arbitrary plane shape. The waxed layer 7 is formed of a mixture of a proper amount of viscous material and powdered petroleum wax melting at selectively preset temperature. The temperature sensitive piece 9 is affixed to a sheet-shaped base 1 with the waxed layer 7 being located close to the front face of the temperature sensor label. The entire face of the base 1 facing the front face of the temperature sensor label is covered with a transparent film 5.

8 Claims, 4 Drawing Sheets

TEMPERATURE SENSOR LABEL

BACKGROUND OF THE INVENTION

1. Field of the Invention

This invention relates to a temperature sensor label, and more particularly, to a temperature sensor label that is affixed to a desired part of various types of apparatus requiring temperature regulation and irreversibly indicates, by means of color change phenomenon, the fact that the temperature of the apparatus has reached or overrun a preset level.

2. Description of Related Art

A temperature sensor label is capable of being affixed easily to a desired part of various types of apparatus and being used in a small space without the need of a power source or the like. For these reasons, such temperature sensor labels are widely used in all kinds of industries to regulate the temperature of the apparatus. The temperature sensor labels are of an irreversible type and a reversible type. The irreversible temperature sensor label changes color to indicate the fact that the temperature of a measured object has reached or overrun a preset level, and continues the same color indication even after the temperature of the measured object has decreased back to the set level or lower. The reversible temperature sensor label changes the color indication in response to the change in the temperature of the measured object.

The irreversible temperature sensor label is used widely, for example, for the temperature regulation of remotely located and unmanned apparatus or apparatus needing to be regularly checked at fixed intervals. There are various types of coloring mechanism for the irreversible temperature sensor label. The currently mainstream type is the coloring mechanism in which colored paper and a sheet-form temperature sensitive material impregnated with a meltable substance melting at a preset temperature are placed on top of each other and a colored face of the colored paper which has been obscured and unseen from the outside shows through because of the melting phenomenon of the meltable substance. In this type, it goes without saying that the meltable substance melting at a preset temperature is a significantly important factor and the meltable substance has a decisive effect on the pass/fail evaluation of sensing accuracy. The irreversible temperature sensor label is of two types, either using chemical substance or using petroleum wax as the meltable substance.

Regarding the type of chemical substance used, chemical substances melting at certain temperatures are pre-selected through experimentation or the like, and then a temperature sensitive material is made properly selectively using a chemical substance suited to the required preset temperature. More specifically, if the preset temperature is 45° C., trilaurin is used. If the preset temperature is 50° C., myristic acid is used. If the preset temperature is 70° C., behenic acid is used. If the preset temperature is 95° C., stearamide is used. In this manner, various chemical substances are selectively used to produce individually suited temperature sensitive materials.

Such a type of temperature sensor label using chemical substances has the advantages of being capable of relatively precisely sensing the temperature and being relatively unliable to alter its quality even under adverse conditions of use such as under high temperature conditions. However, by reason of the need to prepare various chemical substances differing according to the preset temperatures, there are disadvantages. Just the stock control in the manufacturing location in itself is an onerous task, and therefore the manufacturing costs for the temperature sensor labels are significantly increased.

On the other hand, the type of irreversible temperature sensor label using petroleum wax as the meltable substance has a great advantage of keeping the manufacturing costs considerably below those for the type using the chemical substances. More specifically, petroleum wax is a substance that has been widely used in many kinds of industrial fields through the ages, and the elucidation of its composition and characteristic properties have been developed over time. Due to the consequent accumulation of abundant data, at the present time, the setting of slightly different melting temperatures (melting points) as required is allowed by means of refining treatment and blending. Further, because of significantly easy availability of petroleum wax, it can be said that petroleum wax has outstanding characteristic properties as a meltable substance for the temperature sensor label.

FIG. 1 illustrates a typical example of the type of temperature sensor label using petroleum wax, which is currently commonly manufactured. A waxed paper 2 impregnated with petroleum wax melting at a preset temperature is mounted on a base 1. A colored paper 3 is overlaid on the waxed paper 2 with a colored face 4 thereof facing the waxed paper 2. Then, a transparent film 5 covers the entire front surface. In this temperature sensor label, the colored face 4 of the colored paper 3 is positioned on the rear side so as to be obscured and normally unseen. However, once the temperature reaches a preset level, the petroleum wax with which the waxed paper 2 is impregnated melts and penetrates the colored paper 3 to make it transparent. As a result, the colored face 4 which has been unseen hitherto shows through the front surface, that is, it becomes visible from above to show the change in color.

However, the temperature sensor label using the conventional petroleum wax involves still another problem concerning its weathering properties. That is, if a fracture such as pin-hole occurs in the transparent film 5 for any reason, water enters the inside through the fracture, Thereupon, the water is absorbed by the colored paper 3 itself, or alternatively, is retained between the colored paper 3 and the waxed paper 2. As a result of this, the precise change of coloring at the preset temperature is inhibited.

Further, petroleum wax itself has the property of vaporizing at high temperature. Therefore, when the preset temperature is high, the petroleum wax with which the waxed paper 2 is impregnated vaporizes, though only slightly, so that sufficient change in coloring may not be produced.

BRIEF SUMMARY OF THE INVENTION

It is therefore an object of the present invention to provide a petroleum wax-using temperature sensor label that is capable of making the effective use of advantages of petroleum wax, which is easily procurable available as required for various melting temperatures, and is as good in quality as a chemical substance-using temperature sensor label from the viewpoint of its high-temperature characteristics and weathering properties.

It is another object of the present invention to provide a temperature sensor label capable of minimizing the risk of producing defective items.

It is yet another object of the present invention to provide a highly accurate temperature sensor label at low cost.

DETAILED DESCRIPTION OF THE INVENTION

A preferred embodiment of a temperature sensor label according to the present invention will be described below with reference to the accompanying drawings.

Figure 1:
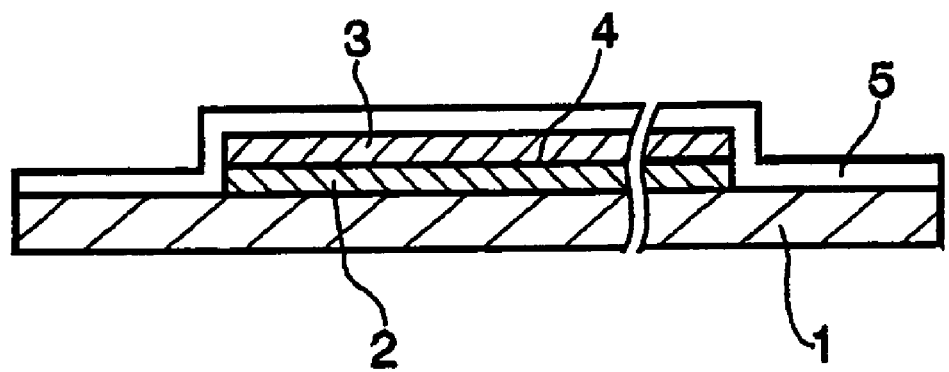
FIG. 1 is an enlarged sectional view of a typical example of a conventional temperature sensor label using petroleum wax as a meltable substance.
Figure 2:
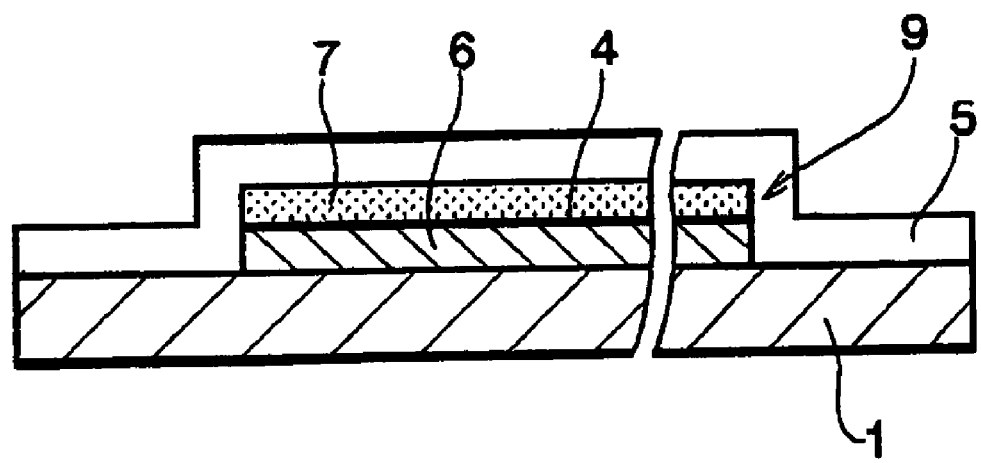
FIG. 2 is an enlarged sectional view of an embodiment of a temperature sensor label according to the present invention.
Figure 3:
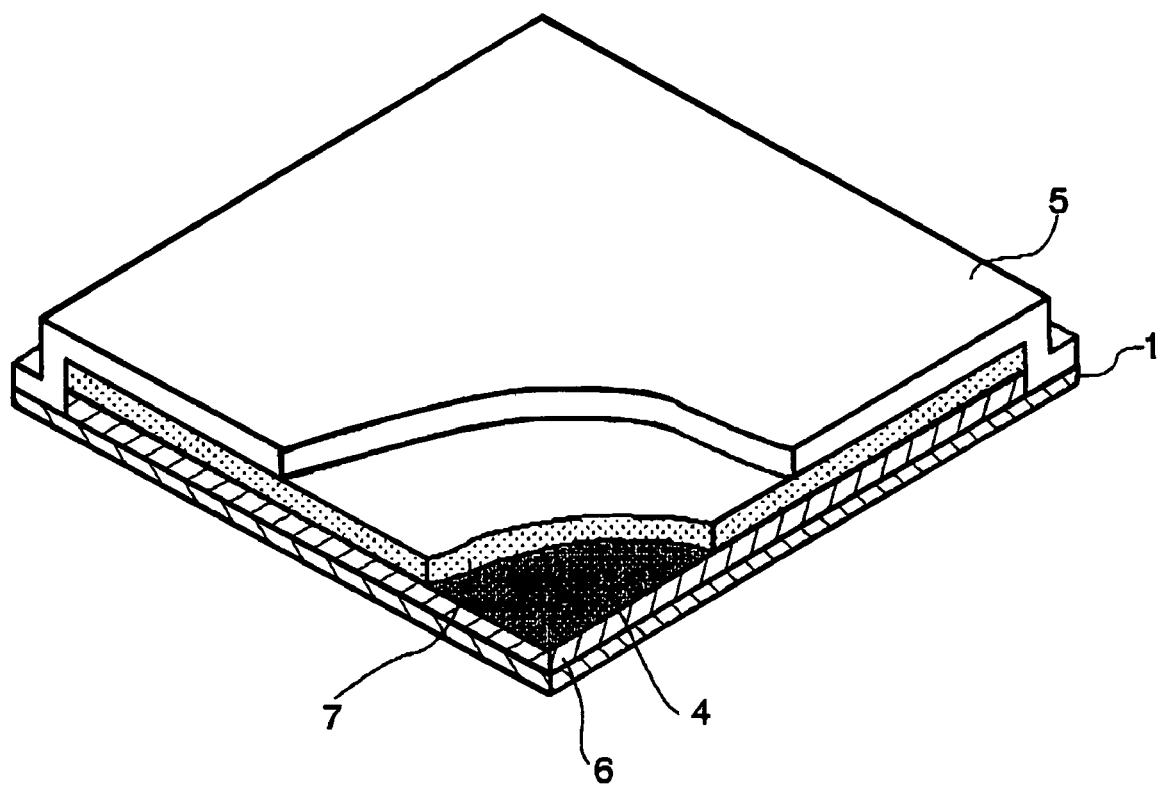
FIG. 3 is an enlarged and partially cut-away perspective view of the same.

FIGS. 2 and 3 show a sheet-form base 1 on which a colored paper 6 stamped into a desired shape is affixed with a colored face 4 facing upward, namely, toward the front of the temperature sensor label. On the colored face 4 of the colored paper 6, a wax mixture of a powdered petroleum wax which melts at a selectively preset temperature, a viscous material, and a solvent is coated to form an opaque waxed layer 7.

Figure 7:
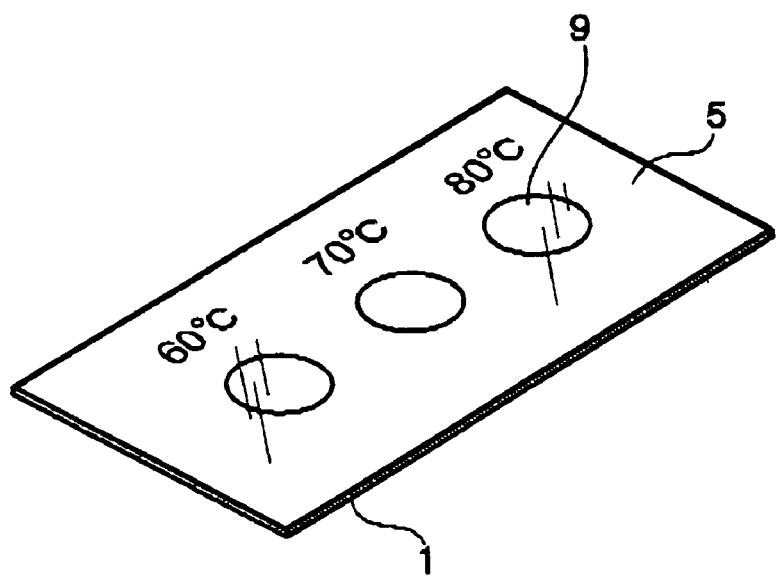
FIG. 7 is a perspective view of the temperature sensor label according to the present invention.

Further, the entire front surface of the base 1 is covered with a transparent film 5 to form a temperature sensor label as shown in FIG. 7. In the embodiment, ethyl cellulose is used as the viscous material. Butanol is used as the solvent. To about 41 wt % of petroleum wax pre-powdered in a preliminary process, about 4 wt % ethyl cellulose and about 55 wt % butanol are added. The three together are loaded into a ball mill, and powdered and mixed by the ball mill for about 70 hours so as to be more fine-grained, to obtain a wax mixture in an opaque state.

Figure 4:
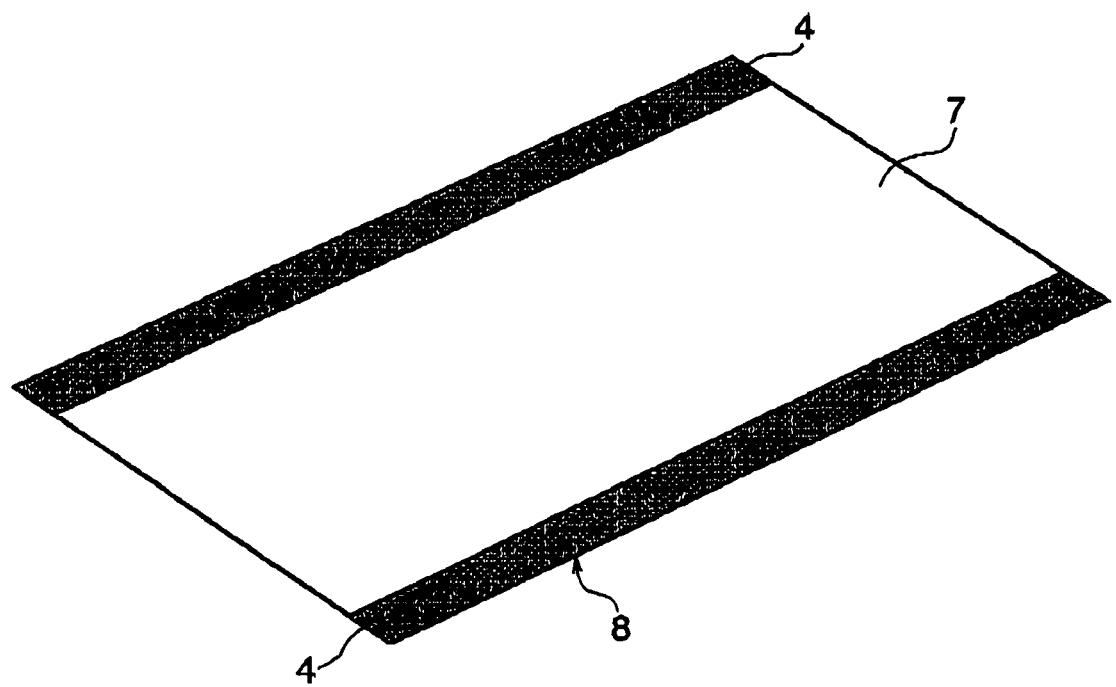
FIG. 4 is a perspective view illustrating a manufacturing process for the temperature sensor label according to the present invention.
Figure 5:
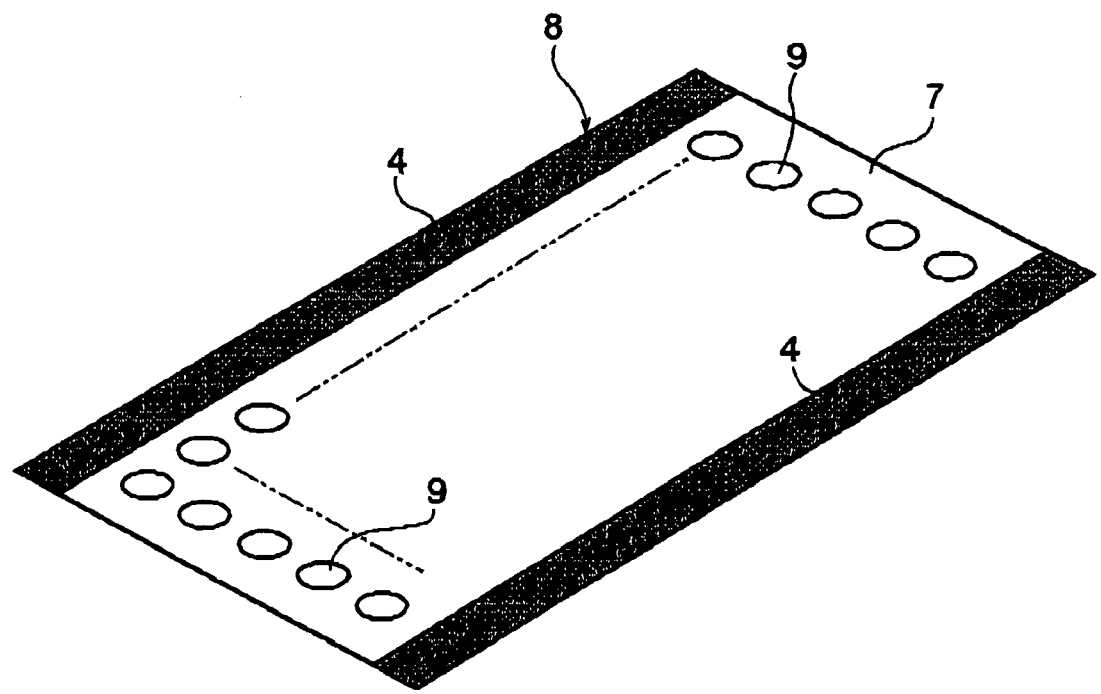
FIG. 5 is a perspective view illustrating a manufacturing process of the same.
Figure 6:
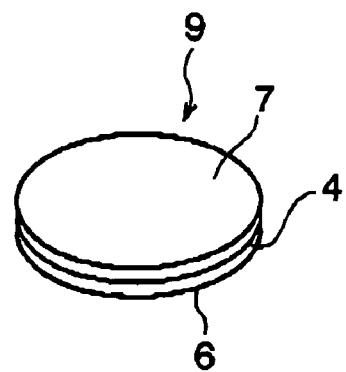
FIG. 6 is a perspective view of a temperature sensitive piece 9 which is a principal part of the temperature sensor label.

As illustrated in FIG. 4, the obtained wax mixture is coated on the paint face 4 of a sheet-form colored base-paper 8 by a screen printing technique or the like to form the waxed layer 7. Then, as illustrated in FIG. 5, the resulting waxed layer 7 is stamped into a required shape to form temperature sensitive pieces 9 as shown in FIG. 6. The temperature sensitive piece 9 is affixed to the sheet-form base 1. Then, the entire front surface of the base 1 is covered with the transparent film 5 to form a temperature sensor label.

The petroleum wax loaded into the ball mill may be in bulk form. In this case, the powdering process in the ball mill requires a considerable length of time. Hence, such petroleum wax is preferably pre-powdered as a preliminary process. The petroleum wax is able to take on an extremely fine powder form through the preliminary powdering and the powdering in the ball mill. Petroleum wax is fundamentally transparent or translucent, and grained into fine powders by the ball mill as described above.

An aggregate of the powdered grains of petroleum wax does not allow the passage of light therethough to create diffuse reflection, and thus is in an opaque and whitish state.

Ethyl cellulose used as the viscous material serves as a binder for coupling the powered grains of petroleum wax to each other, thereby allowing the powdered petroleum wax to be coated on the colored base paper 8 to form the waxed layer 7. The wax mixture after the completion of powdering arid mixing process in the ball mill, which is in a fluid state having syrupy viscosity, is coated on the colored base paper 8. Then, the colored base paper 8 with the wax mixture coated is left standing for a fixed time period. Thereafter, butanol included in the wax mixture as the solvent is vaporized, so that a white-colored waxed layer 7 is formed on the colored base paper 8. The embodiment employs ethyl cellulose as the viscous material and butanol as the solvent, but any substance other than ethyl cellulose and butanol can be sued as the viscous material and the solvent, and also the percentages of compounding of the substances are not limited to those described in the embodiment.

In the embodiment the temperature sensor label has the external appearance as shown in FIG. 7, and is affixed, with a double-faced adhesive tape or the like, to a desired part of apparatus that will undergo temperature measurement using the temperature sensor label. When the temperature of the part of the apparatus to which the temperature sensor label is affixed reaches or exceeds a preset level, the powdered petroleum wax forming the waxed layer 7 melts and the powdered grains of petroleum wax are coupled together to result in fluid wax. Due to this change in phases, the color of the waxed layer is changed from white to translucence close to transparency. Further, a portion of the fluid wax penetrates and spreads across the colored paper 6 to allow the colored face 4 of the colored paper 6 to show through. Thus, it appears that the white-colored indication portion of the temperature sensor label changes in color, and thereby the fact that the temperature of the apparatus reaches or overruns the preset temperature level is shown.

After the temperature of the apparatus has reached or overrun the preset level, if the temperature decreases, the petroleum wax in the waxed layer 7 re-changes in state from fluid to solid, but does not return to a powdered state. Hence, the translucent state of the petroleum wax remains even when it is in the solid state.

EFFECT OF THE INVENTION

Petroleum wax is used as a meltable substance. Hence, the need to prepare various chemical substances suited to different preset temperatures as required when the chemical substances are used is eliminated. Free selection of preset temperatures is allowed by means of refining and blending. Therefore, stock control of raw materials is facilitated and a significant reduction in procurement cost is achieved. As a result, it is possible to respond adequately to the demands of the so-called high-mix low-volume production at low costs.

Further, the use of petroleum wax, about which the accumulation of abundant data is available, as the meltable substance makes it possible to offer a highly accurate temperature sensor label.

Still further, because the waxed layer 7 having the water repellent properties is formed on the front face of the colored paper 6, if a fracture such as pin-hole occurs in the transparent film 5 for any reason and water enters therefrom, the waxed layer 7 inhibits the entry of the water from the waxed layer 7 toward the inside of the temperature sensor label. Thus, there is no fear of degradation in function caused by the entry of water.

Yet further, because ethyl cellulose used as the viscous material included in the wax mixture has the property of inhibiting the vaporization of petroleum wax, vaporization from the wax layer 7 does not occur even in the case of high preset temperature. Thus, the temperature sensor label is capable of maintaining the performance of changing the color indications without being disadvantageously reduced by the vaporization of petroleum wax.

Further, the wax mixture is coated on the colored base paper 8 and dried. After that, the colored base paper 8 with the wax mixture coat is simply stamped into a proper shape to form principal parts of the temperature sensor labels. Therefore, as compared with the cases of conventional temperature sensor labels, it is possible to decrease the number of process steps for manufacturing the temperature sensor labels according to the present invention. This decrease in the number of process steps causes a reduction in risk of accidentally mixing, during the manufacturing process, kinds of temperature sensor labels which differ in preset temperatures and are difficult to be differentiated from one another from outward appearances, resulting in a reduction in the proportion of defective items produced.

What is claimed is:

1. A temperature sensor label comprising: a temperature sensitive piece having a waxed layer formed on a colored face of a colored paper having an arbitrary plane shape, the waxed layer being formed of a mixture of a proper amount of viscous material and powdered petroleum wax which melts at a selectively preset temperature, the temperature sensitive piece being affixed to a sheet-shaped base with the waxed layer being located close to the front face of the temperature sensor label, and then the entire face of the base facing the front face of the temperature sensor label being covered with a transparent film.

2. A method for manufacturing a temperature sensor label comprising: a wax mixture is provided that has a proper amount of viscous material, a proper amount of solvent, and powdered petroleum wax which melts at a selectively preset temperature, the wax mixture is coated on a colored face of a colored base paper to form a waxed layer which is opaque due to said petroleum wax being powdered and is translucent or transparent after the powdered petroleum wax is melted into a melted form or resolidified into an unpowdered solid form, the waxed layer is stamped into an arbitrary plane shape to form temperature sensitive piece, then the temperature sensitive piece is affixed to a sheet-shaped base with the waxed layer being located close to the front face of the temperature sensor label, and then the entire face of the base facing the front face of the temperature sensor label is covered with a transparent film.

3. A temperature sensor label comprising:
a colored paper having a colored face;
a temperature sensitive waxed layer formed on the colored face, the waxed layer being formed of a mixture of an effective amount of viscous material and powdered petroleum wax, the powdered petroleum wax having a predetermined melting temperature and being opaque while in powdered form wherein said opaqueness is due to said powdered form, wherein the colored paper and the waxed layer define a temperature sensitive piece with the petroleum wax being translucent or transparent and the colored face being visible after melting of the powdered petroleum wax;
a sheet-shaped base, the temperature sensitive piece being affixed to the base with the waxed layer being disposed adjacent a front face of the temperature sensor label; and
a transparent film covering a face of the base at the front face of the temperature sensor label.

4. The temperature sensor label of claim 3, wherein the temperature sensitive waxed layer resists evaporation at high temperature.

5. The temperature sensor label of claim 3, wherein the temperature sensitive waxed layer resists separation from the colored face upon exposure to water.

6. The temperature sensor label of claim 3, wherein opaqueness of the powdered petroleum wax defines a color different from that of said colored face.

7. The temperature sensor label of claim 3, wherein the petroleum wax is translucent or transparent when in a melted form.

8. The temperature sensor label of claim 7, wherein the petroleum wax is in an unpowdered solid form when becoming solid after melting and defines a translucent or transparent wax layer overlying the colored face when in said unpowdered solid form.

\* \* \* \* \*